United States Patent [19]

Naddeo et al.

[11] Patent Number: 5,332,471

[45] Date of Patent: Jul. 26, 1994

[54] DYE STRIPPING BY OXYGEN IN SECONDARY FIBER RECOVERY

[75] Inventors: Ronald C. Naddeo, Kempton; Konstantinos Hristofas, Allentown; Vincent L. Magnotta, Wescosville, all of Pa.

[73] Assignee: Air Products and Chemicals, Inc., Allentown, Pa.

[21] Appl. No.: 25,688

[22] Filed: Mar. 3, 1993

Related U.S. Application Data

[62] Division of Ser. No. 703,547, May 21, 1991, Pat. No. 5,211,809.

[51] Int. Cl.$^5$ .................. D21C 5/02; D21C 9/147
[52] U.S. Cl. .................................. 162/6; 162/7; 162/8
[58] Field of Search .................. 162/5, 6, 7, 8, 65

[56] References Cited

U.S. PATENT DOCUMENTS

| | | | |
|---|---|---|---|
| 4,162,186 | 7/1979 | Wood et al. | 162/5 |
| 4,416,727 | 11/1983 | Elton et al. | 162/6 |
| 4,518,459 | 5/1985 | Freis et al. | 162/5 |
| 4,618,400 | 10/1986 | Wood et al. | 162/5 |
| 4,897,156 | 1/1990 | Samuelson | 162/65 |

FOREIGN PATENT DOCUMENTS

| | | | |
|---|---|---|---|
| 247934 | 7/1987 | Fed. Rep. of Germany . | |
| 1601408 | 10/1970 | France | 162/65 |

OTHER PUBLICATIONS

Ruvo, et al; "Upgrading of Pulp from Corrugated Containers by Oxygen Delignification"; Tappi Journal, Jun. 1986.
Berger, et al; "Advanced Bleaching Technology for Secondary Fibers"–Fall, 1990, Pacific Paper Expo.
Matzke, et al; "Various Approaches for Understanding and Improving Secondary Fiber Brightness"; Tappi Press, 1990.
Liebergott, N; "Bleaching with Reductive Agents"; North Carolina Chlorine-free Bleaching Workshop, Mar. 18-20, 1991.
Joachimides, T., et al; "Bleaching Deinked Pulps"; 1990 Pulping Conference.
Markham, et al; "Oxygen Bleaching of Secondary Fiber Grades"; Tappi Journal; Dec. 1988.

*Primary Examiner*—Karen M. Hastings
*Attorney, Agent, or Firm*—John M. Fernbacher; James C. Simmons; William F. Marsh

[57] ABSTRACT

Color is removed from secondary pulps with non-chlorine based bleaching agents in treating sequences using oxygen with combinations of peroxide, ozone, and/or hydrosulfite at/controlled pH conditions. Acid treatment prior to bleaching steps improves color removal and protects fibers from damage at more severe bleaching conditions.

4 Claims, No Drawings

DYE STRIPPING BY OXYGEN IN SECONDARY FIBER RECOVERY

This is a division of application Ser. No. 07/703,547 filed on May 21, 1991 now U.S. Pat. No. 5,211,809.

FIELD OF THE INVENTION

The present invention pertains to the removal of color from secondary pulps used for making recycled paper products, and in particular to the use of oxygen in the color removal process.

BACKGROUND OF THE INVENTION

Waste paper materials often contain color which must be removed in order to make decolorized secondary pulp for the production of high brightness recycled paper products. Color is caused by dyes, pigments, inks, and other color-causing compounds added in the production and printing of final paper products. Color also may be caused by residual lignin which is present in secondary pulps prepared from waste paper materials containing unbleached paper such as newsprint, cardboard, unbleached Kraft, and the like. Color is usually removed or stripped from secondary pulps by treatment with chlorine or chlorine-based bleaching agents such as sodium hypochlorite, hypochlorous acid, and chlorine dioxide. Because of developing trends toward reducing or eliminating chlorine-based bleaching processes due to environmental regulations and consumer preferences, new color removal or color stripping processes which reduce or eliminate chlorine-based bleaching agents are needed in the secondary fiber recovery industry.

Oxygen delignification of pulp from corrugated containers is described in an article by A. de Ruvo et al entitled "Upgrading of Pulp from Corrugated Containers by Oxygen Delignification" in *Tappi Journal*, June 1986, pp. 100–103. Contacting of pulp with oxygen and alkali at elevated temperatures removes lignin, as measured by a reduction in kappa number, and also produces paper with improved tensile strength and burst index.

U.S. Pat. No. 4,416,727 discloses a process for recovering and maintaining the brightness of fibers from wet-strength resin-coated waste paper furnish by pulping the furnish in an alkaline solution and contacting the pulp with oxygen to dissolve the polymeric wet-strength resins followed by recovery of the acceptable fibers in a washing step.

German Patent Application DD 247 934 A1 discloses a process for improving the optical homogeneity of deinked waste paper materials by the addition of oxygen and alkali at elevated temperatures. The fiber material thus treated is available for further treating, preferably for papers for graphic purposes.

L. D. Markham and C. E. Courchene, in an article entitled "Oxygen Bleaching of Secondary Fiber Grades" published in *Tappi Journal*, December 1988 at pp.168–174, disclose oxygen bleaching for the removal of dirt and for improving the brightness and bleachability of recycled pulps. Oxygen delignification of a number of mixed waste paper materials as determined by kappa number and brightness measurements were carried out in laboratory and pilot plant tests. The use of oxygen-hypochlorite and oxygen-peroxide sequences were studied briefly. The authors conclude that oxygen bleaching with appropriate screening and cleaning technology can produce bleached or unbleached pulp of high quality from a low-grade wastepaper furnish.

In a paper given at the Tappi Pulping Conference 1990, October 14–17, Toronto, entitled "Environmentally Safe Bleaching of Post Consumer Waste Papers", J. E. Angulo describes several chlorine-based and non-chlorine-based bleaching sequences for secondary fibers. Several sequences using oxidative reinforced extraction stages, such as Ep (extraction stage with peroxide) and Epo (extraction stage with peroxide and oxygen), were disclosed for the reduction of chlorine-based chemical doses in combination bleaching sequences. In addition, data for the sequences Epo-Z-P, Epo-P, Z-Epo-P, and Epo-P-Y were disclosed (Z denotes ozone and Y denotes hydrosulfite).

Non-chlorine, non-oxygen bleaching sequences for secondary fibers have been described in four other recent papers. T. Joachimides and M. Hache in 1990 *Pulping Conference, TAPPI Proceedings*, pp 507–513 in an article entitled "Bleaching Deinked Pulps" discuss the use of sodium hydrosulfite, formamidine sulfinic acid, and hydrogen peroxide for bleaching deinked newsprint. M. T. Berger et al disclose the use of hydrogen peroxide and/or sodium hydrosulfite for bleaching secondary fibers in deinked and colored secondary pulp in an article entitled "Advanced Bleaching Technology for Secondary Fibers" published in the proceedings of the Pacific Paper Expo, MB, Howe Sound, Canada, Fall 1990. W. H. Matzke and H. H. Selder discuss the use of hydrogen peroxide and/or sodium hydrosulfite for bleaching secondary fibers from low-brightness waste paper stock in a paper entitled "Various Approaches for Understanding and Improving Secondary Fiber Brightness" in *Recycling Paper: From Fiber to Finished Product*, pp. 698–708, TAPPI Press, 1990. In a paper entitled "Bleaching with Reductive Agents" given at the North Carolina Chlorine-free Bleaching Workshop, Mar. 18–20 1991, N. Liebergott discloses conditions and results for the bleaching of colored secondary fiber pulp using various sequences including ozone, hydrogen peroxide, sodium hydrosulfite, and formamidine sulfinic acid.

Environmental regulations and consumer demands will restrict and reduce the future use of chlorine-based bleaching agents. In addition, the growing incentives for waste paper recycling will require greater use of lower-quality grades of waste paper which contain higher amounts of colored paper products, and this trend will require more economical and efficient methods of color removal in the secondary fiber recovery industry. The present invention addresses these needs by describing new and useful methods for color removal from secondary pulps used for the manufacture of recycled paper products.

SUMMARY OF THE INVENTION

The invention is a method for removing color from a pulp prepared from waste paper material which comprises contacting the pulp in a first step with an oxygen-containing gas at pH values of less than about 8 or greater than about 10 wherein oxygen reacts with one or more color-causing compounds present in the pulp, thereby removing color to yield a decolorized pulp suitable for making a recycled paper product. Optionally, hydrogen peroxide can be added to the pulp along with the oxygen-containing gas. In this option, the pulp can be treated with either hydrogen peroxide or ozone in a second step, or can be treated with ozone in a second step and hydrogen peroxide in a third step.

The method further comprises a pretreatment step in which the pulp is contacted with an acid in a pH range of about 1 to 6 prior to the first step of contacting with oxygen. In addition, further treatment optionally comprises a second step In which the acid-pretreated and oxygen-treated pulp is contacted with hydrogen peroxide. The method also may include a third step In which the pulp is contacted with sodium hydrosulfite following the second step of contacting with hydrogen peroxide.

In another option, the first step of oxygen contacting may be followed by a second step in which the pulp is contacted with an acid in a pH range of about 1 to 6. In an optional third step, the pulp is contacted with a bleaching agent selected from the group consisting of oxygen, hydrogen peroxide, and ozone. In an optional fourth step, the pulp is contacted with a bleaching agent selected from the group consisting of oxygen, hydrogen peroxide, and sodium hydrosulfite. In an optional fifth step, the pulp is contacted with a bleaching agent selected from the group consisting of hydrogen peroxide and sodium hydrosulfite.

Another embodiment of the invention comprises a method for removing color from a pulp prepared from waste paper material which comprises contacting the pulp with an oxygen-containing gas, hydrogen peroxide, and one or more dissolved alkaline compounds in a first step wherein oxygen and hydrogen peroxide react with one or more color-causing compounds present in the pulp, thereby removing color to yield a decolorized pulp suitable for making a recycled paper product. In this embodiment, the pulp may be further treated with ozone in a second step, and optionally with additional hydrogen peroxide in a third step.

The invention also comprises a method for removing color from a pulp prepared from waste paper material which comprises (a) contacting the pulp with an oxygen-containing gas and one or more dissolved alkaline compounds wherein oxygen reacts with one or more color-causing compounds present in the pulp, and (b) contacting the pulp with hydrogen peroxide which further reacts with the color-causing compounds present in the pulp; thereby removing color to yield a decolorized pulp suitable for making a recycled paper product. Step (b) optionally is followed by contacting the pulp with sodium hydrosulfite. In this method and in the option of further contacting with sodium hydrosulfite, hydrogen peroxide may be added to the pulp together with the oxygen-containing gas in step (a).

The invention also comprises a method for removing color from a pulp prepared from waste paper material which comprises (a) contacting the pulp with an acid in a pH range of about 1 to 6, and (b) contacting the pulp from step (a) with an oxygen-containing gas and one or more dissolved alkaline compounds wherein oxygen reacts with one or more color-causing compounds present in the pulp; thereby removing color to yield a decolorized pulp suitable for making a recycled paper product. Step (b) is optionally followed by an additional step in which the pulp is contacted with hydrogen peroxide. This additional step may be followed by contacting the pulp with sodium hydrosulfite. Alternately, hydrogen peroxide can be introduced into the oxygen stage along with oxygen and alkali. This alternate may be followed by a third stage of either ozone or hydrogen peroxide contacting. Optionally, the oxygen/peroxide step may be followed sequentially by an ozone stage and a hydrogen peroxide stage.

The invention further comprises a method for removing color from a pulp prepared from waste paper material which comprises (a) contacting the pulp with an oxygen-containing gas and one or more dissolved alkaline compounds wherein oxygen reacts with one or more color-causing compounds present in the pulp, and (b) contacting the pulp with an acid in a pH range of about 1 to 6; thereby removing color to yield a decolorized pulp suitable for making a recycled paper product. In an optional third step, the pulp is contacted with a bleaching agent selected from the group consisting of oxygen, hydrogen peroxide, and ozone. In an optional fourth step, the pulp is contacted with a bleaching agent selected from the group consisting of oxygen, hydrogen peroxide, and sodium hydrosulfite. In an optional fifth step, the pulp is contacted with a bleaching agent selected from the group consisting of hydrogen peroxide and sodium hydrosulfite.

In another embodiment, the invention comprises a method for the preparation of a secondary pulp from waste paper material containing color bodies comprising comminuting the waste paper material with water to form a pulp comprising cellulosic fibers and color-causing compounds, and controlling the pH during the comminuting with water at values below about 8 or above about 10. This embodiment optionally further comprises controlling the pH of the pulp at values below about 8 or above about 10 prior to any subsequent color removal steps.

The invention finally comprises a recycled paper product made from waste paper material containing one or more color-causing compounds by a method comprising (a) comminuting the waste paper material with water to form a pulp comprising cellulosic fibers and the color-causing compounds, (b) contacting the pulp with an oxygen-containing gas and one or more dissolved alkaline compounds at a pH of less than about 8 or greater than about 10, wherein oxygen reacts with the color-causing compounds to yield a decolorized pulp, and (c) processing the decolorized pulp in one or more steps selected from the group consisting of cleaning, screening, flotation, washing, dispersing, and papermaking to yield said recycled paper product selected from the group consisting of tissue, towel, ledger paper, writing paper, computer paper, newsprint, linerboard, and paper bags.

DETAILED DESCRIPTION OF THE INVENTION

Waste paper materials often contain color which must be removed in order to make decolorized secondary pulp for the production of high brightness recycled paper products. As earlier discussed, this color is caused by dyes, pigments, inks, and other color-causing compounds or color bodies added in the production and printing of final paper products. Color also may be caused by residual lignin present in secondary pulps prepared from waste paper furnishes containing some unbleached material such as newsprint, cardboard, and unbleached Kraft. The presence of lignin along with dyes and pigments can cause complex interactions among the reactions which take place when a secondary pulp is decolorized or color stripped with bleaching agents such as oxygen, hydrogen peroxide, ozone, sodium hydrosulfite, and the like. The presence of lignin complicates the removal of color bodies from secondary pulps. For this reason, prior process experience in the delignification and bleaching of secondary pulps which contain lignin but no color bodies cannot be extrapolated directly to secondary pulps containing lignin and color bodies, or for that matter to secondary pulps containing color bodies with no significant lignin. The process embodiments of the present Invention are directed toward the removal of color caused by dyes, pigments, inks, and other color-causing compounds in secondary pulps regardless of the presence or absence of lignin in the pulps. The invention is not directed toward the removal of lignin from secondary pulps which do not contain any significant amounts of color bodies.

For the purposes of this disclosure, the terms color bodies and color-causing compounds have equivalent meaning and define any material or compound added in making a paper product which causes a color detectable by standard optical test procedures for paper sheet made from a furnish containing such a product. These tests include primarily color (L, a, b, 45° 0° colorimetry - Tappi Test Method T 524 om-86) and also include Tappi brightness T 217 wd-71. The terms color stripping, color removal, and bleaching are equivalent and refer to any method for removing color bodies and color-causing compounds from secondary pulps. The term secondary pulp is defined herein as a pulp prepared from (1) pre-consumer waste paper including sorted waste paper and paper mill broke and/or (2) post-consumer waste paper including mixtures of ledger, colored ledger, computer printout, newsprint, old corrugated containers (OCC), cardboard, magazines, leaflets, and packaging.

In describing color stripping sequences in the following disclosure, the standard terminology of the pulp and paper industry will be used. Upper case letters denote separate treating steps or stages carried out in separate pieces of equipment or in different sections of a single piece of equipment, and have the following specific meanings: O denotes oxygen; P denotes peroxide, typically hydrogen peroxide; C denotes chlorine; Z denotes ozone; Y denotes sodium hydrosulfite; A denotes acid; H denotes sodium hypochlorite; and D denotes chlorine dioxide. Lower case letters denote the use of an additional specific compound or compounds in one of the steps denoted by the upper case letters. For example, the sequence step Op denotes an oxygen treatment step or stage in which peroxide is also introduced. The letter E denotes a caustic extraction step which is traditionally used to extract lignin after a chlorination stage. The term Eo denotes an oxygen-caustic extraction stage and the term Eop denotes an oxygen-caustic extraction stage with peroxide addition. The operating conditions in an Eo stage as known in the art are typically a retention time of 5-15 minutes, a NaOH dose of 0.5 to 1.5 wt% on pulp, a temperature of 50°-80 ° C., and a pressure near atmospheric. These conditions differ from the O stage disclosed herein which typically operates at a retention time of 2-120 minutes, a NaOH dose of 0.5 to 15 wt% on pulp, a temperature of 60°-180° C., and a pressure of 20-400 psig. The O stage of the present invention thus requires more severe operating conditions than a prior art Eo stage.

Color is determined herein by the Tappi Official Test Method T 524 om-86 entitled "L, a, b, 45° 0° Colorimetry of White and Near-white Paper and Paperboard" and the results are reported using the Hunter L, a, b color scales. The meaning of these color scales is as follows: L represents lightness increasing from 0 for black to 100 for white; a represents redness when positive and greenness when negative, and zero for gray; and b represents yellowness when positive and blueness when negative, and zero when gray. White and near-white paper generally have L values greater than 80 and values of $(a^2+b^2)^{0.5}$ of 10 or less. In the work disclosed herein, it was found that the parameters L and b were most useful in comparing the effectiveness of various color stripping methods; the value of L should be as high as possible and the value of b should be as near zero as possible. The removal of color from a pulp therefore increases L and reduces b for sheets made from the pulp. The b color value was found to be the most important parameter to determine color removal. Since the presence of color also affects brightness, this parameter also was used as a secondary parameter to compare color stripping methods. Brightness is a measure of the degree of reflectivity of a paper sheet for blue light measured under specified standard conditions; in the present disclosure, the standard Tappi test method T 217 wd-71 was used for measuring brightness.

In the first embodiment of the present invention, a pulp prepared from waste paper material is contacted In a reactor vessel or pipeline reactor with one or more alkaline compounds and oxygen wherein the color bodies in the pulp react with oxygen to yield byproducts which do not cause color, thereby yielding a decolorized pulp which is used to make recycled paper products. The color bodies present in the pulp can include dyes, pigments, inks, and mixtures thereof. The contacting is carried out in a temperature range of about 25° to 200° C., preferably about 80° to 130° C., a total reactor pressure in the range of about 20 to 400 psig, and a pulp consistency between about 0.1 and 45 wt%. The pulp is preheated or may be heated in the reactor by steam injection. Acid or alkali can be added when necessary to control the pH in a desired range. When alkali is required, one or more alkaline compounds may be selected from sodium hydroxide, sodium silicate, sodium thiosulfate, sodium sulfate, sodium carbonate, sodium hydrosulfide, ammonium hydroxide and mixtures thereof. These alkaline compounds optionally can be obtained by using white liquor (an aqueous solution of sodium sulfide and sodium hydroxide), oxidized white liquor (an aqueous solution of sodium thiosulfate and/or sodium sulfate), or green liquor (an aqueous solution of sodium sulfide and sodium carbonate) in the oxygen stage or other stages. The alkaline compounds are added to the pulp in the dosage range of about 0.5 to 15 wt% on dry pulp. The oxygen is added as an oxygen-containing gas containing at least 10 vol% oxygen, preferably between about 85 and 99.5 vol% oxygen. Reactor residence time ranges between about and 120 minutes. The oxygen partial pressure depends on the oxygen concentration In the added gas and the reactor temperature which fixes the vapor pressure of water; the oxygen partial pressure is typically between about 5 and 90 psig.

It has been found in this embodiment of the invention that the alkali addition to the reactor must be controlled such that the pH in the reactor is below about 8 or above about 10, and that the pH should never be between about 8 and 10 for any significant amount of time. If alkali must be added to take the pulp from an initial pH below 8 to a final pH above 10, this transition should be carried out as quickly as possible. Since pH typically drops as the color oxidation reactions occur, enough alkali must be added to ensure that the pH does not drop below about 10. If the pH in the reactor is between about 8 and 10 for any significant amount of time, color removal will be inhibited, and will also be inhibited in any downstream color stripping stages even if the pH is adjusted outside this range. The longer the pH stays between about 8 and about 10, the more severe the inhibition to downstream color stripping. While this unexpected finding is not completely understood, it may be possible that certain dyes and other color bodies are fixed at these reactor conditions when the pH is between about 8 and about 10, thus rendering them more resistant to oxidation at reasonable residence times and pulp yields. This pH effect appears to be compounded by the presence of lignin from unbleached material such as cardboard, old corrugated containers (OCC), kraft pulp, or newspapers if present In the furnish. It also has been found that the pH in any process stage upstream of the oxygen stage should be operated to avoid the pH range of about 8 to 10, since this inhibits color removal in the oxygen stage and in additional color removal stages, regardless of the pH values in any color removal stage. Such an upstream process stage would include a pulping step in which waste paper is comminuted with water to form a pulp.

A number of modifications or additional color stripping stages can be used with the basic embodiment described above. In one optional modification, hydrogen peroxide at doses between about 0.1 and 3.0 wt% on dry pulp can be added directly to the oxygen stage to give a combination Op stage, which can increase color removal at a given set of reactor conditions and maximum allowable pulp residence time. This oxygen/peroxide Op stage is operated in the temperature range of 60°–130° C., a hydrogen peroxide dosage of 0.25–0.50 wt% on pulp, 1–120 minutes retention time, 20–100 psig pressure, and 0.5–15 wt% NaOH on pulp. In another optional modification, the Op stage is followed by separate hydrogen peroxide and/or ozone stages in the sequences OpP, OpZ, and OpZP. A P stage following an O or Op stage is ideal since the temperature and residual NaOH are perfect for peroxide treatment. A P stage operated in a standalone mode requires 1.0–2.0 wt% NaOH or $Na_2SiO_3$on pulp, 0.25 wt% DTPA (the sodium salt of diethylene triamine pentacetic acid) or EDTA (the sodium salt of ethylene diamine tetracetic acid) on pulp, 60°–85° C., and 60-120 minutes retention time. If a P stage follows an O or Op stage, no other chemicals are needed and washing between the O or Op stage and the P stage is not required. The O stage will typically operate at 20°–100° C., 0.1–60 minutes retention time, 0–100 psig pressure, and a pH between 2 and 9. In another option, the oxygen stage can be preceded by an acid stage in an AO sequence in which the pulp is acidified to a pH between about 1 and 6. The acid may be a mineral or organic acid selected from sulfuric, acetic, nitric, hydrochloric, or oxalic acid; an optional source of acid is filtrate from an acid bleaching stage wash step. The acid stage operates at 20°–1000° C. and 2-120 minutes retention time. This treatment appears to enhance color removal and protect the fiber from degradation in further bleaching steps. Alternately, the acid treatment allows the operation of bleaching steps at more severe conditions to achieve higher degrees of color removal at acceptable pulp yields and pulp strength. Such further bleaching steps include hydrogen peroxide, ozone, and sodium hydrosulfite treatment in the sequences AOP, AOPY, or AOZPY. Conditions for a Y stage are 40°–90° C., 15-120 minutes retentions time, and a pH range of 4–8.

In another option of this first embodiment, the oxygen stage can be followed by an by an acid stage in an OA sequence in which the pulp is acidified to a pH between about 1 and 6 using acid selection and operating conditions as earlier described. This treatment appears to enhance color removal and protect the fiber from degradation in further bleaching steps. Alternately, the acid treatment allows further bleaching steps to operate at more severe conditions to achieve higher degrees of color removal at acceptable pulp yields and pulp strength. Such further bleaching steps include a third stage utilizing treatment with oxygen, hydrogen peroxide, or ozone to give the sequences OA(O, P, or Z). A fourth stage may be added utilizing treatment with hydrogen peroxide, ozone, or sodium hydrosulfite to give the sequences OA(O, P, or Y)(O, P, or Z). A fifth stage may be added utilizing treatment with hydrogen peroxide or sodium hydrosulfite to give the sequences OA(O, P, or Y)(O, P, or Z)(P or Y).

In a second embodiment of the present invention, a pulp prepared from waste paper material is contacted in a reactor vessel or pipeline reactor with one or more alkaline compounds, oxygen, and hydrogen peroxide wherein the color bodies in the pulp react with oxygen and hydrogen peroxide to yield byproducts which do not cause color, thereby yielding a decolorized pulp which is used to make recycled paper products. The color bodies present in the pulp can include dyes, pigments, inks, and mixtures thereof. The contacting is carried out at similar conditions to those of the first embodiment described above. A hydrogen peroxide dosage of about 0.1 to 1.0 wt% on dry pulp is preferred. This Op stage optionally may be utilized with additional individual stages of ozone (OpZ), hydrogen peroxide (OpP), ozone and hydrogen peroxide (OpZP), and hydrogen peroxide and sodium hydrosulfite (OpPY). Operating conditions for these stages are as described above.

In a third embodiment of the invention, color is removed from a pulp prepared from waste paper material which comprises (a) contacting the pulp with an oxygen-containing gas and one or more dissolved alkaline compounds wherein oxygen reacts with one or more color-causing compounds present in the pulp, and (b) contacting the pulp with hydrogen peroxide which further reacts with the color-causing compounds present in the pulp; thereby removing color to yield a decolorized pulp suitable for making a recycled paper product. Alkaline compounds are selected as defined above. This embodiment differs from the usual practice in using an OP sequence for delignification in that (1) there is no washing step between stages and (2) no caustic or sodium silicate is added to the peroxide stage. This OP sequence optionally is followed by a sodium hydrosulfite treatment step in an OPY sequence. There is no general pH limitation in this embodiment and the optional modification thereto, although for certain furnishes it may be necessary to operate the oxygen stage at a pH less than 8 or greater than 10 to avoid dye fixing as earlier discussed.

A fourth embodiment of the invention comprises a method for removing color from a pulp prepared from waste paper material which comprises (a) contacting the pulp with an acid in a pH range of about 1 to 6, and (b) contacting the pulp from step (a) with an oxygen-containing gas and one or more dissolved alkaline compounds wherein oxygen reacts with one or more color-causing compounds present in the pulp; thereby removing color to yield a decolorized pulp suitable for making a recycled paper product. This AO sequence optionally is followed by an additional step in which the pulp is contacted with hydrogen peroxide to give an AOP sequence. This additional step may be followed by contacting the pulp with sodium hydrosulfite to give an AOPY sequence. Alternately, hydrogen peroxide can be introduced into the oxygen stage along with oxygen and alkali. This alternate AOp sequence may be followed by a third stage of either ozone or hydrogen peroxide to give AOpZ or AOpP sequences. Optionally, the oxygen/peroxide step may be followed sequentially by an ozone stage and a hydrogen peroxide stage in an AOpZP sequence.

The invention in a fifth embodiment also comprises a method for removing color from a pulp prepared from waste paper material which comprises (a) contacting the pulp with an oxygen-containing gas and one or more dissolved alkaline compounds wherein oxygen reacts with one or more color-causing compounds present in the pulp, and (b) contacting the pulp with an acid in a pH range of about 1 to 6; thereby removing color in an OA sequence to yield a decolorized pulp suitable for making a recycled paper product. The acid stage operates at conditions described earlier. This acid stage appears to enhance color removal and protect the fiber from degradation in further bleaching steps. Alternately, the acid treatment allows further bleaching steps to operate at more severe conditions to achieve higher degrees of color removal at acceptable pulp yields and pulp strength. Such further bleaching steps include an optional third step in which the pulp is contacted with a bleaching agent selected from the group consisting of oxygen, hydrogen peroxide, and ozone in the sequences OA(O, P, or Z). In an optional fourth step, the pulp is contacted with a bleaching agent selected from the group consisting of oxygen, hydrogen peroxide, and sodium hydrosulfite in the sequences OA(O, P, or Y)(O, P, or Z). In an optional fifth step, the pulp is contacted with a bleaching agent selected from the group consisting of hydrogen peroxide and sodium hydrosulfite in the sequences OA(O, P, or Y)(O, P, or Z)(P or Y).

In the five embodiments described above, alkali addition may be required in any of the stages. This can be achieved by adding one or more alkaline compounds selected from sodium hydroxide, sodium silicate, sodium thiosulfate, sodium sulfate, sodium carbonate, sodium hydrosulfide, ammonium hydroxide and mixtures thereof. These alkaline compounds optionally can be obtained by using white liquor (an aqueous solution of sodium sulfide and sodium hydroxide), oxidized white liquor (an aqueous solution of sodium thiosulfate and/or sodium sulfate), or green liquor (an aqueous solution of sodium sulfide and sodium carbonate) in the oxygen stage or other stages. The alkaline compounds are added to the pulp in the dosage range of about 0.5 to 15 wt% on dry pulp. The oxygen is added as an oxygen-containing gas containing at least 10 vol% oxygen, preferably between about 85 and 99.5 vol% oxygen.

The furnish utilized in these embodiments may include at least 0.1 wt% of one or more unbleached materials such as groundwood, newsprint, certain magazines, old corrugated containers, and the like. As discussed earlier, the presence of lignin along with dyes and pigments can cause complex interactions among the reactions which take place when a secondary pulp is decolorized or color stripped with bleaching agents such as oxygen, hydrogen peroxide, ozone, sodium hydrosulfite, and the like. The presence of lignin complicates the removal of color bodies from secondary pulps. For this reason, prior process experience in the delignification and bleaching of virgin or secondary pulps which contain lignin but no color bodies cannot be extrapolated directly to secondary pulps containing lignin and color bodies, or for that matter to secondary pulps containing color bodies with no significant lignin. The process embodiments of the present invention are directed toward the removal of color caused by dyes, pigments, inks, and other color-causing compounds in secondary pulps regardless of the presence or absence of lignin in the pulp. However, when lignin is present along with color bodies in pulps being treated by the embodiments of the present invention, the lignin will also be removed at least in part and can affect the overall color stripping process as discussed below. The invention is not directed toward the removal of lignin from secondary pulps which do not contain any significant amounts of color bodies. Such pulps are obtained from waste paper materials which contain essentially no colored papers.

In color stripping of pulps containing both color bodies and lignin, it has been found that oxalate salts are formed in the oxygen stage because of the presence of lignocellulose, and that these oxalate salts can be maximized by using fully oxidized white liquor (an aqueous solution of sodium sulfate) in the oxygen stage. When this pulp is acidified in a subsequent acid stage, oxalic acid is formed which assists in bleaching and protects the cellulose fibers from degradation by ozone and other oxidants. Thus the use of oxidized white liquor in an oxygen stage with the use of a subsequent acid stage enhances the color stripping of secondary pulps containing color bodies as well as lignin. Acid treatment alternately can be achieved simultaneously with oxygen treatment by adding acid rather than alkali to an oxygen stage.

The following examples further clarify and support the present invention as described above.

EXAMPLE 1

Pulp samples were prepared from waste paper containing 60 wt% white ledger, 30 wt% colored ledger, and 10 wt% groundwood using tap water to yield pulp with a 12% consistency at a pH of 7.3. A first pulp sample (untreated) was used to make a handsheet for further testing. A second pulp sample was treated with sufficient NaOH to raise the pH to 8.5, where it was held for 16 hours. The pulp was then mixed with NaOH at 3.0 wt% on pulp and fed to a laboratory reactor which was sealed, pressurized with oxygen having a purity of 99.8 vol%, and heated with steam. The reactor contents were mixed for one minute at 800 rpm to initiate the reaction with oxygen. The oxygen treatment was carried out at 130° C., a total pressure of 60 psig, and a retention time of 40 minutes. Treated pulp was removed from the reactor, washed, and a portion was used to prepare a handsheet for further testing. The remainder of this oxygen-treated pulp was further treated at 70° C. with 1.0 wt% hydrogen peroxide, 0.3 wt% NaOH, 2.0 wt% sodium silicate, and 0.25 wt% EDTA to an initial pH of 11.4. After a retention time of 120 minutes, the pulp was removed, cooled, and made into a handsheet for further testing. A third pulp sample was treated with sufficient NaOH to raise the pH to 10.0, where it was held for 4 hours. This pulp was then treated in a laboratory reactor with oxygen by the same procedure as described above, and the treated pulp was used to make a handsheet for further testing. Fourth, fifth, and sixth pulp samples were treated in a laboratory reactor with oxygen by the same procedure as described above except that these samples were not held at an intermediate pH before oxygen treatment; with all of these three samples the pH values of these pulp samples were raised to 12.2 or above in a few seconds by rapid NaOH addition. Samples of the pulp so treated were used to make handsheets for further testing. Part of the sixth pulp sample after oxygen treatment was further treated at 70° C. with 1.0 hydrogen peroxide, 0.3 wt% NaOH, 2.0 wt% sodium silicate, and 0.25 wt% EDTA at an initial pH of 11.6. After a retention time of 120 minutes, the pulp was removed, cooled, and made into a handsheet for further testing. A seventh pulp sample was treated with oxygen in a similar procedure except that sodium hydroxide at 0.3 wt% and sodium silicate at 2.0 wt% were added to the pulp, and a handsheet was made. An eighth pulp sample was treated with oxygen in a similar procedure except that no alkali was used, and a handsheet was made. In all pulp treating steps described above, pH values were measured on pulp samples before and after treatment. All handsheets were then tested for color and brightness using the Tappi T 524 om-86 and T 217 wd-71 methods respectively.

The test conditions and handsheet results are given in Table 1. These results show unexpectedly that color removal in the oxygen stage is inhibited if the pulp is held at a pH in a range which includes 8.5 and 10.0 for any significant amount of time before color stripping, and in fact the important color parameter b for pulp samples 2 and 3 actually increases compared with the untreated sample. This is clearly shown in the L, b, and brightness values after oxygen treatment for pulp samples 2 and 3 as compared with the corresponding values for samples 4, 5, 6, and 7. Results from pulp sample 8 show that a similar increase in the b color value can occur if the reactor pH is at about 8 or slightly above for any significant time during the oxygen treatment step, even if the pulp was not held in a critical pH range of about 8 to about 10 prior to oxygen treatment.

An additional test was carried out with a similar but more highly colored furnish to better understand the apparent break point in color removal at about pH 8. The furnish contained 60 wt% white ledger, 30 wt% colored ledger, and 10 wt% groundwood, and was pulped without treatment and a portion thereof made into a handsheet. Color measurements were made indicating a b value of 12.9, an L value of 83.3, and a brightness of 54.4. The pH of the remaining pulp was reduced to 5.4 by rapid acid addition, and the sample was treated immediately with oxygen in the same manner as the eighth pulp sample, yielding a final pH of 7.9. The treated pulp was then made into a handsheet and tested for color and brightness. Results showed that the important b color value was reduced to 10.2, along with modest L color value improvements and brightness to 83.8 and 58.4 respectively. This differs from the results of pulp sample 8, in which the important b color value actually increased after treatment, and indicates a breakpoint in color removal at about pH 8. It was therefore concluded from this test and tests on pulp samples 2-8 that color stripping using oxygen should be carried out at pH values in the reactor above about 10 and below about 8, regardless of earlier pulp treatment conditions.

Further treatment of pulp sample 6 with hydrogen peroxide gave a much higher quality handsheet than one prepared after the same peroxide treatment of pulp sample 2. This shows that some peroxide-resistant color bodies apparently are formed when the pulp is held at a pH in a range which includes 8.5 and 10.0 for any significant amount of time before color stripping. The complete results of these tests for pulp samples 1-8 are given in Table 1.

TABLE 1

EFFECT OF pH ON COLOR STRIPPING
(12% CONSISTENCY)

| Pulp Sample | Stage | Initial pH | Intermediate pH/Time | pH During Color Stripping | | Handsheet Test Results | | | |
|---|---|---|---|---|---|---|---|---|---|
| | | | | Initial | Final | Brightness | L | b | Δb |
| 1 | — | 7.3 | — | Untreated | | 58.7 | 83.5 | 9.5 | 0 |
| 2 | O | 7.3 | 8.5/16 Hrs. | 11.9 | 11.2 | 59.2 | 85.4 | 11.6 | −2.1 |
| 3 | O | 7.3 | 10.0/4 Hrs. | 12.6 | 11.7 | 63.0 | 86.1 | 9.7 | −0.2 |
| 4 | O | 7.3 | — | 12.2 | 10.5 | 72.5 | 89.0 | 5.8 | 3.7 |
| 5 | O | 7.3 | — | 12.8 | 11.5 | 75.6 | 89.8 | 4.2 | 5.3 |
| 6 | O | 7.3 | — | 12.5 | 10.9 | 76.4 | 90.0 | 3.8 | 5.7 |
| 7 | O | 7.3 | — | 11.3 | 9.8 | 71.9 | 89.0 | 5.9 | 3.6 |
| 8 | O | 7.3 | — | 7.3 | 8.3 | 70.0 | 90.0 | 13.4 | −3.9 |
| 2* | P | 11.4 | — | 11.4 | 10.9 | 71.0 | 89.7 | 7.7 | 1.8 |
| 6* | P | 11.6 | — | 11.6 | 10.9 | 81.1 | 91.7 | 2.4 | 7.1 |

*Pulp treated with P after O to give OP sequence.

EXAMPLE 2

The procedures used for preparing the fourth, fifth, and sixth pulp samples of Example 1 were repeated for a Furnish A containing 60 wt% white ledger, 30 wt% colored ledger, 5 wt% newspaper, and 5 wt% bleached groundwood and a Furnish B containing 25 wt% old corrugated containers, 25 wt% colored ledger, 35 wt% white ledger, and 15 wt% news and magazines. In addition, some pulps were treated with sodium hydrosulfite in a third stage, and hydrogen peroxide was added to the oxygen stage in some cases. For Furnish A, the oxygen stage was operated at 95° C., 60 psig, and a retention time of 40 minutes using a sodium hydroxide dose of 3 wt% on pulp; the peroxide stage (second stage) was operated at 70° C., at atmospheric pressure, and a retention time of 120 minutes using the following chemical doses (wt% on pulp): sodium hydroxide −0.5%, hydrogen peroxide −1.0%, EDTA −0.25%, and sodium silicate −2.0 wt%; and the hydrosulfite stage (third stage) was operated at 65 ° C., atmospheric pressure, and a retention time of 30 minutes with a sodium hydrosulfite dose of 1.0 wt% on pulp. For Furnish B, an Op first stage was operated at 130° C., 90 psig, and a retention time of 30 minutes using a sodium hydroxide dose of 5.0 wt% and a hydrogen peroxide dose of 0.5 wt%; and a peroxide stage (second stage) was operated at 85° C., atmospheric pressure, and a 60 minute retention time with a sodium hydroxide dose of 0.8 wt% and a hydrogen peroxide dose of 1.0 wt%. For Furnish A, the O stage had an initial pH of 12.2 and a final pH of 10.3, and the P stage had an initial pH of 11.5 and a final pH of about 10. For Furnish B, the initial and final O stage pH values were 12.6 and 10.2 respectively; the pH values in the P stage were the same as for Furnish A. Handsheets were made, and color and brightness were determined. Results are given in Table 2.

TABLE 2

| Furnish | Sequence | Brightness | L | b |
|---|---|---|---|---|
| A | Untreated | 58.7 | 83.5 | 9.5 |
| A | O | 76.4 | 90.0 | 3.8 |
| A | OP | 81.1 | 91.7 | 2.4 |
| A | OPY | 85.7 | 94.5 | 2.7 |
| B | Untreated | 47.2 | 71.1 | 15.3 |
| B | Op | 64.5 | 84.3 | 8.4 |
| B | OpP | 73.1 | 88.2 | 7.3 |
| B | OpPY | 78.1 | — | — |

These results show that excellent color stripping and brightness can be achieved using these sequences without the use of chlorine-based bleaching agents.

EXAMPLE 3

Additional color stripping tests were carried out using the procedures of Example 1, and Furnishes A and B of Example 2, to determine the effects of acid treatment in various sequences. Oxalic acid and sulfuric acid were used in the acid stages for Furnishes A and B respectively. Process conditions for the various O, A, P, and Y stages are summarized in Tables 3 and 4; dosages are wt on dry pulp. The results of these tests are given in Table 5.

TABLE 3

STAGE CONDITIONS FOR FURNISH A

| Process Variables | Stage Conditions | | | |
|---|---|---|---|---|
| | O | A | P | Y |
| Temperature, °C. | 95 | 70 | 70 | 65 |
| Pressure, psig | 60 | — | — | — |
| NaOH, wt % | 3 | — | .5 | — |
| Retention Time, min | 40 | 1 | 120 | 120 |
| Oxalic Acid, wt % | — | 5 | — | — |
| P, wt % | — | — | 1 | — |
| Y, wt % | — | — | — | 1 |
| EDTA, wt % | — | — | .25 | — |
| Na2SiO3, wt % | — | — | 2 | — |
| Initial pH | 12.2 | 2.0 | 10.9 | 6.5 |
| Final pH | 10.4 | 3.0 | 9.5 | 3.4 |

TABLE 4

STAGE CONDITIONS FOR FURNISH B

| Process Variables | Stage Conditions | | | | |
|---|---|---|---|---|---|
| | O | A | O | P | Y |
| Temperature, °C. | 130 | 95 | 85 | 70 | 65 |
| Pressure, psig | 90 | 40 | 40 | — | — |
| NaOH, wt % | 5 | — | 2 | 8 | — |
| Retention Time, min | 30 | 60 | 15 | 120 | 120 |
| H2SO4, wt % | — | 8 | — | — | — |
| P, wt % | — | — | — | 1 | — |
| Y, wt % | — | — | — | — | 1 |
| Initial pH | 13.0 | 1.0 | 13.0 | 10.6 | 6.5 |
| Final pH | 9.8 | 1.5 | 10.6 | 9.0 | 7.3 |

TABLE 5

| Results of Acid Treatment Sequences | | |
|---|---|---|
| Furnish | Process Sequence | Brightness |
| A | Untreated | 58.3 |
| A | OPY | 76.1 |
| A | OAP | 70.3 |
| A | OAPY | 78.2 |
| B | Untreated | 50.2 |
| B | O | 49.6 |
| B | OPY | 57.3 |
| B | OAOP | 58.2 |

The results for Furnish A show that additional brightness can be gained through acid treatment compared with an unacidified bleach sequence. The results for the Furnish B show that acid treatment with oxygen and peroxide stages gives improved brightness compared with an oxygen-peroxide-hydrosulfite sequence.

Additional oxygen color stripping runs were made using a furnish of unbleached kraft pulp having an initial kappa number of 25. The pulp was treated in the laboratory reactor at 95° C. 90 psig, 45 minutes retention time, and with 2.5 wt% NaOH on pulp. The source of this NaOH was a simulated white liquor containing 100 g/l NaOH and 35 g/l Na2S. This test was repeated using a simulated oxidized white liquor as a source of NaOH; this liquor contained 100 g/l NaOH and 40 g/l Na2SO4. The two tests were repeated again at the same conditions. The concentrations of oxalate salts were measured on the four treated pulps and are given in Table 6.

TABLE 6

| Oxalate Salts vs Alkali Source | |
|---|---|
| NaOH Source | Oxalate Salts, g/l |
| White liquor | 0.1 |
| White liquor | 0.3 |
| Oxidized White Liquor | 1.6 |
| Oxidized White Liquor | 1.4 |

These results indicate that the combination of lignin and oxidized white liquor in an oxygen stage generates a significant amount of oxalate salts which as earlier discussed are beneficial in further stages of color stripping.

EXAMPLE 4

Color stripping tests using the procedures of Example 1 were carried out to quantify the effects of acid treatment on three sequences using O, P, and Y. Sodium hydrosulfite (Y) was added as V-Brite B, a bleaching agent containing sodium hydrosulfite and undefined inhibitors, which is sold by Hoechst Celanese. An additional test was done on the handsheets to determine yellowness by the ASTM Test No. E313. The furnish for these tests contained 81 wt% deinked washed pulp, 14.5 wt% colored paper, 1.6 wt% old corrugated container (OCC), and 2.9 wt% newspapers. The treatment conditions for these tests are summarized in Table 7 and the results are given in Table 8.

TABLE 7

| SEQUENCE CONDITIONS | | | | | |
|---|---|---|---|---|---|
| | OXYGEN STAGE | | Acid Activation | P | Y |
| Conditions | 1st | 2nd | | | |
| Temperature, °C. | 95 | 25 | 70 | 70 C. | |
| Pressure, psig | 90 | 90 | — | | |
| Retention time | 20 min | 20 min | 5 min | 2 hr | 30 min |

TABLE 7-continued

SEQUENCE CONDITIONS

| Conditions | OXYGEN STAGE 1st | OXYGEN STAGE 2nd | Acid Activation | P | Y |
|---|---|---|---|---|---|
| NaOH, wt % on pulp | 2.5 | 1.5 | — | 1 | |
| $H_2O_2$, wt % on pulp | 0 | 0.5 | — | 1 | |
| $H_2SO_4$, wt % on pulp | | | 3.4 (pH 3.7) | | |
| V-Brite B | | | | | 1% |

TABLE 8

BRIGHTNESS AND COLOR RESULTS

| Sample | % Yield | pH Initial | pH Final | Brightness | L | b | ASTM Yellowness |
|---|---|---|---|---|---|---|---|
| Untreated | — | — | — | 53.6 | 81.2 | 11.0 | 19.4 |
| OAO | 96.3 | 11.5 | 10.9 | 67.6 | 87.5 | 7.5 | 12.4 |
| OAOP | — | 11.0 | 9.7 | 68.6 | 87.4 | 6.7 | 11.9 |
| OAOPY | — | 6.7 | 7.5 | 73.1 | 88.8 | 5.0 | 8.1 |
| OO | 95.3 | 11.7 | 11.6 | 61.8 | 84.8 | 8.9 | 15.0 |
| OOP | — | 11.1 | 10.9 | 65.4 | 86.0 | 7.3 | 12.2 |
| OOPY | — | 7.1 | 7.9 | 69.5 | 87.9 | 6.6 | 10.7 |

The results from these tests show that an acid activation stage after the first oxygen stage in these sequences improves color stripping in all cases for all measured parameters, and results in higher pulp yields as well. Thus acid treatment is a preferred option in multiple-step color stripping sequences for secondary pulp.

EXAMPLE 5

Color stripping tests were carried out using procedures described above to determine the effect of acid treatment in sequences containing peroxide and ozone stages. In this Example the oxygen stage included the addition of hydrogen peroxide. The furnish for these tests contained 75 wt% deinking grade (inked ledger), 10 wt% colored ledger, 10 wt% groundwood, and 5 wt% miscellaneous papers. In addition to measurements of brightness and color, the tensile strength of each handsheet was measured using the Tappi test method T-494 om-88. The conditions for these tests are summarized in Table 9 and the results are given in Table 10.

TABLE 9

CONDITIONS FOR A, Op, Z, P STAGES

| Stage Variables | Op, OpP, OpZ, OpZP Op | Op, OpP, OpZ, OpZP Z | AOP, AOpP, AOpZ, AOpPZ A | AOP, AOpP, AOpZ, AOpPZ Op | AOP, AOpP, AOpZ, AOpPZ Z | All P |
|---|---|---|---|---|---|---|
| Temperature, °C. | 130 | 20 | 43 | 93 | 80 → 50 | 65 |
| Pressure, psig | 50 → 25 | — | — | 50 → 25 | — | — |
| NaOH, wt % on pulp | 3 | — | — | 0.7 | — | 0.25 |
| $H_2O_2$, wt % on pulp | 0.35 | — | — | 0.35 | — | 1.5 |
| Ozone, wt % on pulp | — | 2 | — | — | 2 | — |
| Retention time, min | 25 | 2 | 30 | 25 | 2 | 120 |
| Consistency, % | 10 | 30 | 4 | 10 | 30 | 30 |
| Final pH | 10.4 | 7.5 | 3 | 9.6 | 7.5 | 9 |

TABLE 10

RESULTS FOR A, Op, P, Z SEQUENCES

| Bleaching Sequence | Brightness | L | b | Tensile Strength, Nm/gram |
|---|---|---|---|---|
| Untreated | 65 | 83.7 | 4.5 | 32.4 |
| Op | 70.6 | 88.7 | 6.8 | 28.8 |
| OpP | 76.3 | 90.3 | 4.5 | 29.3 |
| OpZ | 74.1 | 89.5 | 5.1 | 34.7 |
| OpZP | 78.8 | 91 | 3.5 | 36.0 |
| AOp | 74.7 | 89 | 4 | 32.1 |
| AOpP | 80.2 | 91.1 | 2.6 | 42.7 |
| AOpZ | 77.6 | 90.4 | 3.6 | 45.1 |
| AOpZP | 80.4 | 91.2 | 2.5 | 47.1 |

These results further confirm the desirability of an acid activation stage in color stripping, and show that in all cases better color removal and brightness are achieved through the use of an acid stage prior to the first oxygen stage. The results also show that an AOpP sequence with two oxidation stages gives slightly better color removal than the three oxidation stage sequence OpZP. Unexpectedly, the acid-treated pulp makes sheets with much higher tensile strengths than sheets made with pulp from non-acid sequences. Apparently the acid treatment increases fiber bonding in addition to promoting color stripping.

EXAMPLE 6

Color stripping tests were carried out using procedures described above to compare the AOpP and OpP sequences of the present invention with chlorine-based bleach sequences. The furnish for these tests contained 80 wt% inked ledger, 10 wt% groundwood, 5 wt% dyed ledger, and 5 wt% miscellaneous paper. The chlorine stage was operated at pH 3.5 with a 20 minute retention time, and the Op stage following the chlorine stage was operated at a 40 minute retention time. The Op (not preceded by chlorine) and P stages were operated at retention times of 25 and 60 minutes respectively. All Op stages were operated at an initial pressure of 50 psig dropping to a final pressure of 20 psig to simulate the pressure change as pulp moves upward in an upflow bleaching tower. A summary of the stage conditions and brightness measurements is given in Table 11. These results show that the single oxidation stage AOp sequence of the present invention gives color removal as measured by brightness which is equivalent to the chlorine-based sequences with three oxidation stages at certain conditions. In addition, the results show that the two oxidation stage sequence AOpP of the present invention gives results nearly equivalent to the three oxidation stage chlorine-based sequences at the higher chlorine dosages.

TABLE 11

Chlorine vs Non-chlorine Color Stripping

| Sequence | Wt % $Cl_2$ | $H_2O_2$ Wt % | Temp., °C. | NaOH, Wt % | Initial pH | Brightness |
|---|---|---|---|---|---|---|
| Untreated | | | | | | 65.0 |
| CEpP | 2 | 0.35 | 75 | 0.8 | 11.5 | 78.0 |
| COpP | 2 | 0.35 | 75 | 0.8 | 11.5 | 80.5 |
| COpP | 2 | 0.35 | 95 | 0.8 | 11.5 | 80.9 |
| COpP | 2 | 0.35 | 95 | 3.0 | 12.5 | 79.9 |
| COpP | 1 | 0.35 | 95 | 0.8 | 11.5 | 77.2 |
| COpP | 1 | 0.35 | 95 | 3.0 | 12.5 | 79.7 |
| OpP | 0 | 0.35 | 95 | 3.0 | 12.5 | 78.5 |
| AOpP | 0 | 0.35 | 95 | 3.0 | 12.5 | 80.2 |

Thus the embodiments of the present invention comprise new and useful methods for color stripping to yield decolorized pulp in the recovery of secondary fibers from waste paper materials. These methods accomplish color removal without the use of chlorine-based bleaching chemicals and thus meet future requirements for the chlorine-free production of recycled paper products.

The essential characteristics of the present invention are described fully and completely in the foregoing disclosure. One skilled in the art can understand the invention and make various changes and modifications thereto without departing from the basic spirit thereof and without departing from the scope and range of equivalents of the claims which follow.

We claim:

1. A method for the preparation of a secondary pulp from waste paper material containing color bodies including dye comprising comminuting said waste paper material with water to form a pulp comprising cellulosic fibers and said dye while controlling the pH during said comminuting at values below 8 or above 10, and contacting said pulp with an oxygen-containing gas in one or more subsequent stages wherein said oxygen reacts with said dye to yield decolorized pulp.

2. The method of claim 1 wherein one or more dissolved alkaline compounds are added to said one or more subsequent stages and the pH therein is controlled at less than 8 or greater than 10.

3. The method of claim 2 which further comprises bleaching of said decolorized pulp following said contacting with an oxygen-containing gas in one or more additional stages utilizing one or more bleaching agents selected from the group consisting of oxygen, hydrogen peroxide, ozone, and sodium hydrosulfite.

4. The method of claim 2 which further comprises contacting said pulp with an acid at a pH between about 1 to about 6 in a separate stage following said comminuting and prior to said contacting with an oxygen-containing gas in said one or more subsequent stages.

* * * * *